United States Patent [19]

van der Lely

[11] 4,291,946
[45] Sep. 29, 1981

[54] MIRROR ARRANGEMENTS TO PROVIDE SIDE AND REAR VISION FOR TRACTOR WITH IMPLEMENTS

[76] Inventor: Cornelis van der Lely, 7, Brüschenrain, Zug, Switzerland

[21] Appl. No.: 20,733

[22] Filed: Mar. 15, 1979

[30] Foreign Application Priority Data

Mar. 17, 1978 [NL] Netherlands .................. 7802911
Mar. 17, 1978 [NL] Netherlands .................. 7802912

[51] Int. Cl.³ .................. B60R 1/04; B60R 1/10
[52] U.S. Cl. .................. 350/302; 350/307; 180/900
[58] Field of Search ............... 350/293, 301, 302, 307; 180/900

[56] References Cited

U.S. PATENT DOCUMENTS

| | | | |
|---|---|---|---|
| 2,227,769 | 1/1941 | Tedtman | 350/307 X |
| 2,573,443 | 10/1951 | Holland | 350/307 X |
| 2,636,418 | 4/1953 | Leonard | 350/307 X |
| 3,003,396 | 10/1961 | Jenkins | 350/293 |
| 3,463,578 | 8/1969 | Smith | 350/302 |
| 3,858,966 | 1/1975 | Lowell, Jr. | 350/307 |
| 3,932,028 | 1/1976 | Klinger | 350/307 |
| 4,121,680 | 10/1978 | van der Lely | 180/900 X |
| 4,131,170 | 12/1978 | van der Lely | 180/900 X |

FOREIGN PATENT DOCUMENTS

| | | | |
|---|---|---|---|
| 2558390 | 7/1977 | Fed. Rep. of Germany | 350/293 |
| 1145361 | 10/1957 | France | 350/301 |
| 134620 | 3/1979 | German Democratic Rep. | 350/302 |
| 794962 | 5/1958 | United Kingdom | 350/307 |

Primary Examiner—F. L. Evans
Attorney, Agent, or Firm—Mason, Mason and Albright

[57] ABSTRACT

A tractor which is towing two agricultural implements extending transversely relative to the longitudinal axis of the tractor and having a width which is substantially greater than that of the tractor's width, the two implements being coupled to the tractor in tandem. The interior of the tractor's cab has a convex (as seen by the driver) mirror which extends almost completely across the interior of the glassed-in cab of the tractor so as not to block the driver's forward vision, whereby the driver can observe in the mirror both implements across their entire widths as well as the device for coupling both implements to the tractor. In a modification, the convex mirror is of less width (about one-half of the width of the cab) and is flanked by further mirrors on each side which reflect from still further mirrors mounted on the overhead of the cab to provide an increased lateral area which is within the vision of the driver through the mirrors. In a further modification, mirrors mounted forwardly and on both sides of the deck of the cabin reflect from mirrors on the after part of the overhead to provide vision behind the tractor wherein the tractor has a cab located forward and the engine aft with a rearwardly sloped hood over the engine. The mirrors are preferably curved in at least one plane and may be of stainless steel coated with a reflective foil, plexiglass with a silver layer, or a silver-plated tempered glass. The degree of tilt of the mirrors may be established by adjustable members connected thereto.

31 Claims, 8 Drawing Figures

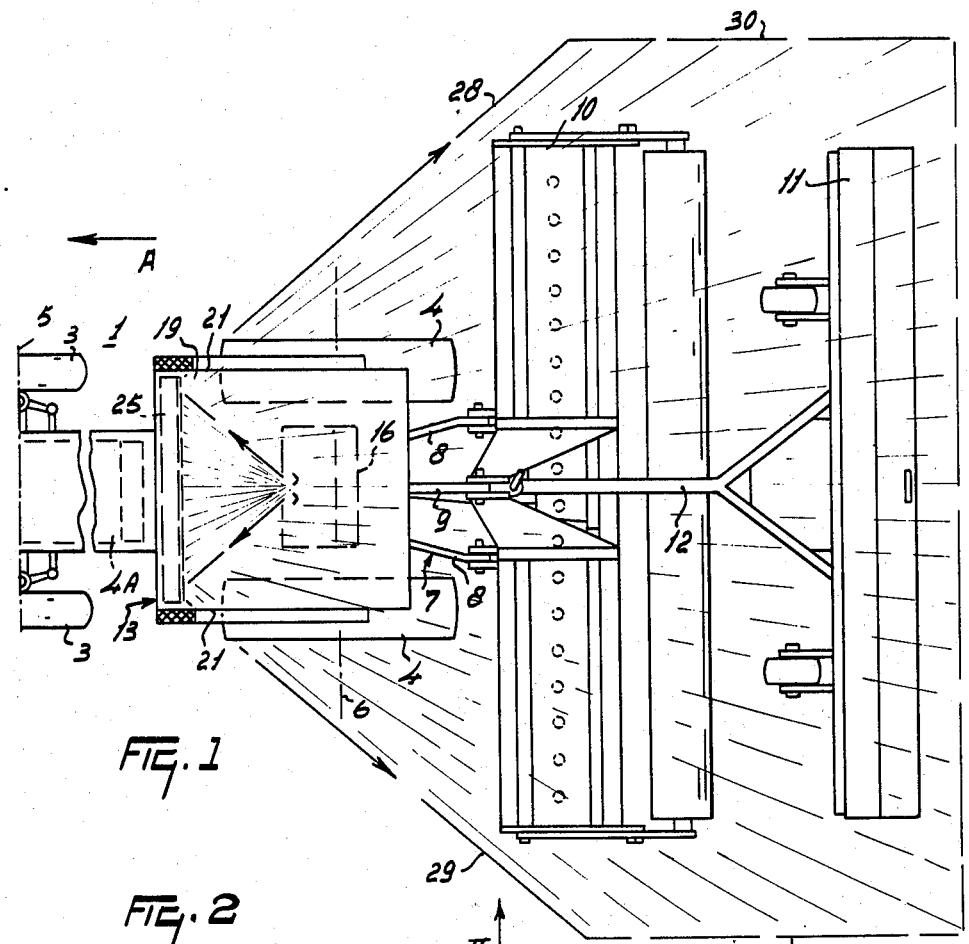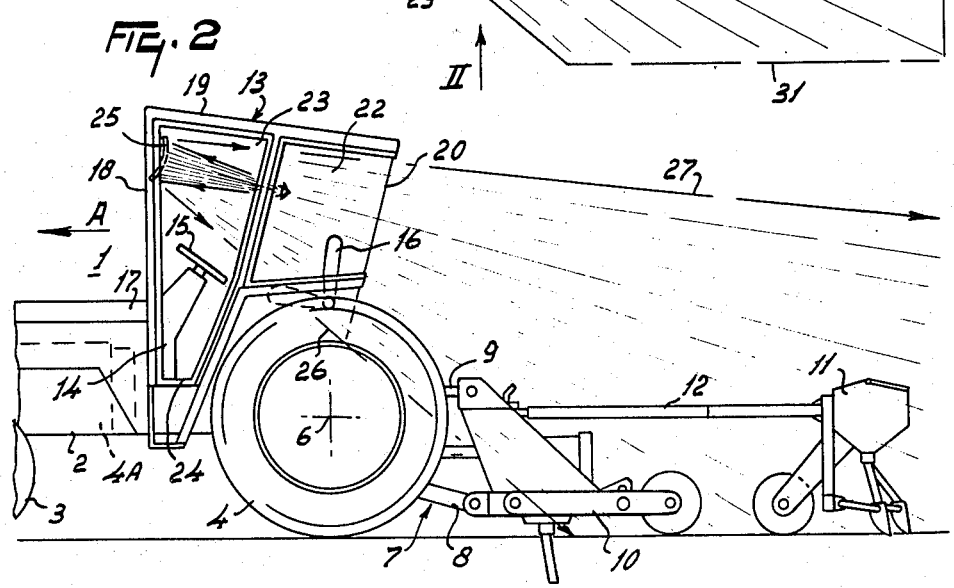

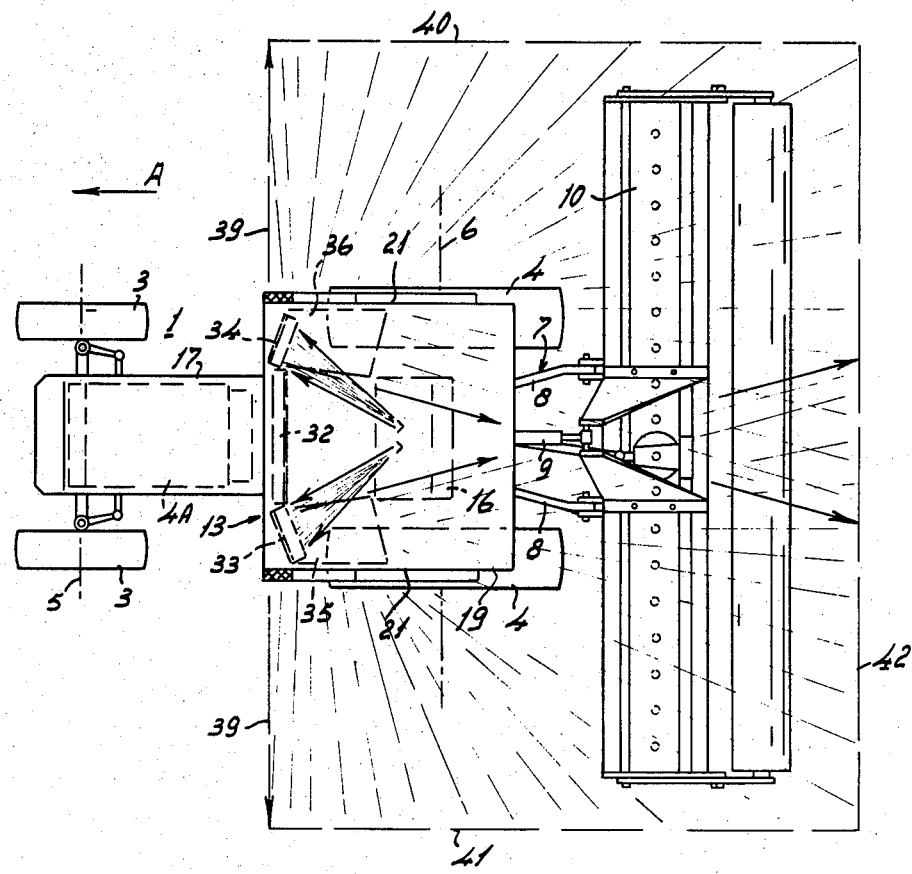
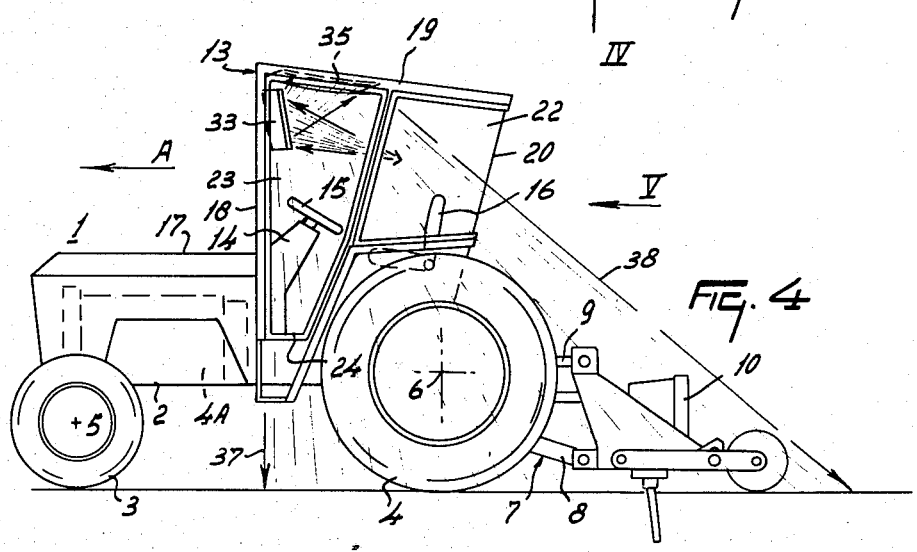

MIRROR ARRANGEMENTS TO PROVIDE SIDE AND REAR VISION FOR TRACTOR WITH IMPLEMENTS

BACKGROUND OF THE INVENTION

The invention relates to a mirror arrangement for the interior of a tractor which is adapted to have coupled thereto one or more implements having a substantially greater width than the tractor whereby the operator of the tractor can see the implements coupled to the tractor and the coupling means effecting such coupling.

In agricultural operations wherein one or more implements are towed by a tractor, the tractor's operator is required constantly to turn rearwardly during such operations to determine that the implements are properly disposed and operating correctly. This can not only be tiring for the operator but, in addition, takes his eyes away from the front of the tractor whereby the tractor may not be steered as desired.

Known devices for rear vision mirrors of motor vehicles frequently are not conducive to tractor operations. Often the mirrors are on the outside of the tractor where they may gather dust and the like and require the operator to turn his head from side or the other whereby his forward vision is impeded. In addition, mirror arrangements which permit an operator to see the blind spot behind the motor vehicle frequently fail to address further areas which should be within the vision of the operator such as occurs with implements having a substantial width. When the mirrors are placed within the cab, frequently reflection on the glass of the cab seriously obstructs the view of the operator through the mirrors. Further, within interior mirror arrangements it is usually necessary that they be relatively inexpensive to produce and install and relatively easy for the operator to manipulate.

Thus, a need exists for a mirror arrangement which will enable the operator of an agricultural tractor to see the coupling devices immediately behind the tractor and, at the same time, a width which extends to both sides of the tractor and which includes the width of the agricultural implements which may be towed or otherwise coupled to the rear of the tractor.

SUMMARY OF THE INVENTION

This invention relates to rear vision arrangement in a motor vehicle.

According to a first aspect of the present invention there is provided a motor vehicle comprising a driver's seat enclosed by a cab and coupling means for hitching further equipment to the vehicle, one or more mirrors being attached to said cab, a driver of the vehicle in the driver's seat being able to see the coupling means by means of said mirror.

According to a second aspect of the present invention there is provided a motor vehicle comprising coupling means for hitching further equipment to the vehicle, one or more mirrors being provided on or in the vehicle, the mirror, or at least one of the mirrors, extending over a length which is not less than one half the width of the vehicle.

According to a third aspect of the present invention there is provided a tractor having a driver's seat and coupling means for the attachment of further equipment, one or more mirrors being arranged whereby visible to a driver in the driver's are seat substantially all of the further equipment attached to the coupling means.

For a better understanding of the present invention and to show how it may be carried into effect, reference will now be made, by way of example only, to the accompanying drawings, in which:

BRIEF DESCRIPTION OF THE DRAWINGS

FIG. 1 is a plan view showing a tractor with attached implements;

FIG. 2 is a side elevation in the direction of the arrow II in FIG. 1;

FIG. 3 is a plan view showing another tractor with an attached implement;

FIG. 4 is a side elevation in the direction of the arrow IV in FIG. 3;

DESCRIPTION OF THE PREFERRED EMBODIMENTS

Figure 5:
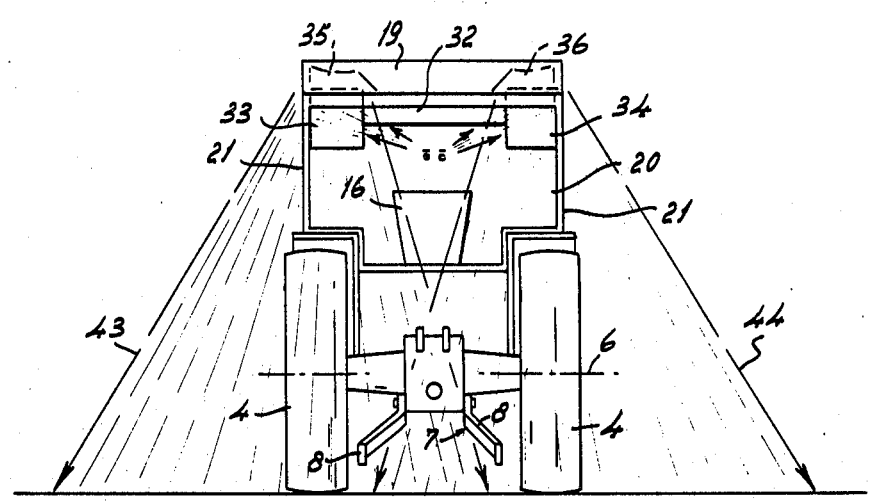
FIG. 5 is a rear view of the tractor seen in the direction of the arrow V in FIG. 4.

The embodiment shown in FIGS. 1 and 2 comprises an agricultural tractor 1 comprising a frame 2, which is supported by steerable front wheels 3 and drivable rear wheels 4. The wheels 3 and 4 are rotatable about wheel axles 5 and 6 respectively. The rear wheels 4 have a larger diameter than the front wheels 3. They can be driven by an engine 4A, which is positioned at a front part of the frame 2, with respect to the intended direction of forward travel of the tractor, indicated by arrows A in FIGS. 1 and 2. The tractor has a three-point lifting device 7 at the rear of the frame 2. This lifting device 7 comprises a pair of lower lifting arms 8 and an upper lifting arm 9. The tractor may have a towing hook at the rear as well as or instead of the lifting device 7.

An agricultural implement, represented as a rotary harrow, is connected to the coupling points of the lower lifting arms 8 and of the upper lifting arm 9. The implement 10 has a coupling to which is hitched by a drawbar 12 a second implement 11, represented as a seed drill. Thus the implement 11 follows the implement 10 and is drawn by the implement 10. Mechanisms of the implements can be driven by means of a power take-off shaft of the tractor located near the lifting device 7. It is common for the width of an implement to be considerably greater than that of the tractor pulling it. In this embodiment the width of the implements is about five to six meters. The total length in the direction A of two or more intercoupled implements, the leading one of which is coupled with the tractor, is often one or more times the length of the tractor itself and may even be twenty to thirty meters.

The tractor comprises a driver's cab 13 accommodating controls 14, such as a steering wheel 15. There is also a driver's seat 16, which is disposed, as shown in FIG. 2, over the front part of the rear wheels 4 at a level above a horizontal plane containing the rear axle 6. The driver's seat 16 is arranged so that the driver sits symmetrically with respect to the vertical longitudinal plane of symmetry of the tractor parallel to the direction A.

The cab 13 is near the rear of the tractor and is therefore near the lifting device 7. It has a front windshield extending from the engine housing 17 to where a front wall 18 and a roof 19 of the cab meet. It covers practically the whole width of the cab, this width (see FIG. 1) being substantially the same as the distance between the vertical longitudinal planes of symmetry of the rear wheels 4. The rear wall 20 of the cab is inclined to the rear from bottom to top and has a rear window 20 extending from where it meets the roof 19 at least to about the height of the tops of the rear wheels 4. This rear window 20 also covers practically the whole width of the cab. The two side walls 21 of the cab 13 each have a rear side window 22 at the rear, which windows extend from the roof 19 at least to the level of the tops of the rear wheels 4. They are at the sides of the driver. The side walls 21 also have front side windows 23 separated from the rear side windows 22 by a slender pillar. The front side windows 23 extend from the roof 19 down as far as the level of a sunken footwell 24 near the front wall 18. The lower sides of the front side windows 23 are a short distance above a horizontal plane containing the rear axle 6. One of the windows 23 forms part of a door of the cab 13.

In the cab 13 there is a mirror 25. The upper edge of the mirror is near the underside of the roof 19 and extends horizontally and transversely of the direction A. The vertical breadth of the mirror is at least twenty centimeters and its length is at least one hundred centimeters. This length exceeds one half the width of the tractor. In the embodiment shown in FIGS. 1 and 2, the mirror covers practically the whole inner width of the cab 13 of the front windshield. The level of the lower edge of the mirror 25 is located high enough to avoid obstructing the forward vision of the driver, and is thus above the level of the driver's eyes. The reflecting surface of the mirror 25 is curved, with the center of curvature ahead of the mirror with respect to the direction A; it is thus convex relative to the driver.

Since the length of the mirror 25 may be about 1.5 to 2.5 meters and the driver's eyes will normally be near the plane of symmetry of the tractor, the driver will be able to see in the mirror an image bounded, as seen in FIG. 2, by lines 26 and 27 and, as seen in FIG. 1, by the lines 28, 29, 30 and 31, and apart from what he can see through the front window and through the side windows 22 and 23 without using the mirror. By virtue of his position relative to the very long convex mirror, the driver can observe, as is shown in FIGS. 1 and 2, the whole width of the implements 10 and 11 and even any further machines attached to them. The distance between the boundary lines 30 and 31 is about six meters.

The improved rearward vision provided by this arrangement is desirable because with present-day tractors accidents may happen because the driver has to turn in his seat to look at the implements attached to the tractor while he is driving forward. This is an unsafe situation. When the driver looks ahead so as to avoid running into people or animals, he cannot see what is happening to the machine coupled with the rear of the tractor. Similarly, when the driver is looking backwards to check the operation of the implements or to see whether people or animals are in danger from rotating parts of the attached implement, he cannot look ahead at the same time. With the arrangement of FIGS. 1 and 2 the driver can now have an overall picture of what is happening in front of and behind him while looking ahead; he can then respond without delay if necessary. These considerations also apply to the following embodiments.

FIGS. 3 and 4 show a further embodiment. The tractor and the attached implement 10 are the same as in FIGS. 1 and 2, but there is no implement 11. Corresponding parts are designated by the same reference numerals. In this case a mirror 32 is arranged in front of the driver and at the same level as the mirror 25 of FIGS. 1 and 2, the lower edge of the mirror 32 being at a higher level than the driver's eyes. The vertical breadth of the mirror is also at least twenty centimeters, but in this embodiment the length is smaller than in the embodiment of FIGS. 1 and 2, but still greater than one meter. The length of this mirror 32 is about 50 to 70% of the length of the mirror 25 of the first embodiment. The mirror 32 is, as before, arranged symmetrically to the vertical, longitudinal plane of symmetry of the tractor, and like the mirror 25, it is preferably convex. On each side of the mirror 32 there is an upright mirror 33 or 34. These mirrors 33 and 34 are preferably flat and symmetrical with respect to the vertical, longitudinal plane of symmetry of the tractor. The mirrors 32, 33 and 34 together cover a width exceeding one half the width of the tractor, and preferably more than two-thirds of the width of the front wall 18. The mirrors 33 and 34 are inclined in positions at the front upper corners of the cab in a manner such that a line normal to the surface at the center of each mirror is inclined upwardly and inwardly to the rear with respect to the longitudinal plane of symmetry of the tractor. The periphery of each mirror 33 and 34 is preferably rectangular and, as shown in the rear view of FIG. 5, the upper edge is horizontal. The vertical height of each mirror 33 or 34 exceeds that of the mirror 32. As shown in the view of FIG. 5, mirrors 35 and 36 are arranged, generally horizontally, above the mirrors 33 and 34, generally parallel to the underside of the roof 19. The mirrors 35 and 36 extend along the ceiling of the tractor cab over a distance which is at least one-quarter of the length of the ceiling in the direction A. The mirrors 35 and 36 are located behind the mirrors 33 and 34. The shape and the dimensions of the two symmetrically disposed mirrors 35 and 36 and those of the mirrors 33 and 34 co-operating with them are such that the driver looking to the mirrors 33 and 34 sees, via the mirrors 35 and 36, all objects and the ground within the space bounded, as seen in FIG. 4, by the planes 37 and 38 and, as seen in FIG. 5, by the planes 43 and 44. As seen in FIG. 3, these planes 37, 38, 43 and 44 project on the ground a rectangle having sides 39, 40, 41 and 42. The overall image is, of course, also produced with the aid of the mirror 32. From FIGS. 3 to 5, it will be appreciated that the mirrors 32 to 36 enable the driver, looking ahead from his seat, to check a field of view bounded by a vertical plane 37 going through the front wall 18 of the cab and extending transversely of the tractor and by a ground-level rectangle located behind the plane 37 and bounded by the plane 43 and 44 inclined downwardly and outwardly away from the mirrors 35 and 36 at an acute angle of about 45° to the ground and by a plane 38 (see FIG. 4) inclined downwardly to the rear from the rear sides of the mirrors 35 and 36, this plane 38 going over the top of the implement 10. The distance between the boundary lines 40 and 41 is not less than the width of the implement 10 and may be about five to six meters.

The shape of each of the mirrors 35 and 36 and their boundaries are preferably such that, when the driver looks into the mirror 33 or 34 from his seat, the perimeter 39 to 42 on the ground surface just coincides with the substantially rectangular periphery of the mirrors 33 and 34 (the so-called "viewed" surface), and also with the periphery of the mirrors 35 and 36. The latter periphery has non-parallel sides of different lengths. The mirrors 35 and 36 are curved in two planes. The center of curvature is above the mirror concerned, so the mirrors are convex. The mirrors 35 and 36 occupy at least one-tenth of the surface of the cab ceiling.

Thus in this embodiment the driver can overlook a broad range extending from the plane going through the front of the cab on both sides of the tractor for a distance to the rear of the tractor so that an implement or a train of implements attached to the lifting device 7 and having a width of, for example, five to six meters is completely within his field of view. It is, of course, important for the cab 13 to be a short distance in front of the lifting device 7 so that the driver, while looking ahead, can also see the coupling point. The disposition of the mirrors 33 to 36 is such that they do not obstruct the forward vision of the driver. The lower edge of the transverse mirror 32 is at a higher level than the lower edges of the lateral mirrors 33 and 34. If desired, the mirrors 33 and 34 may be tiltable so that they can be put in a position approximately parallel to the mirrors 35 and 36 respectively. The position of the mirrors 33 and 34 shown in FIGS. 3 to 5 is determined by a stop (not shown), when the mirrors are again tilted down.

Figure 6:
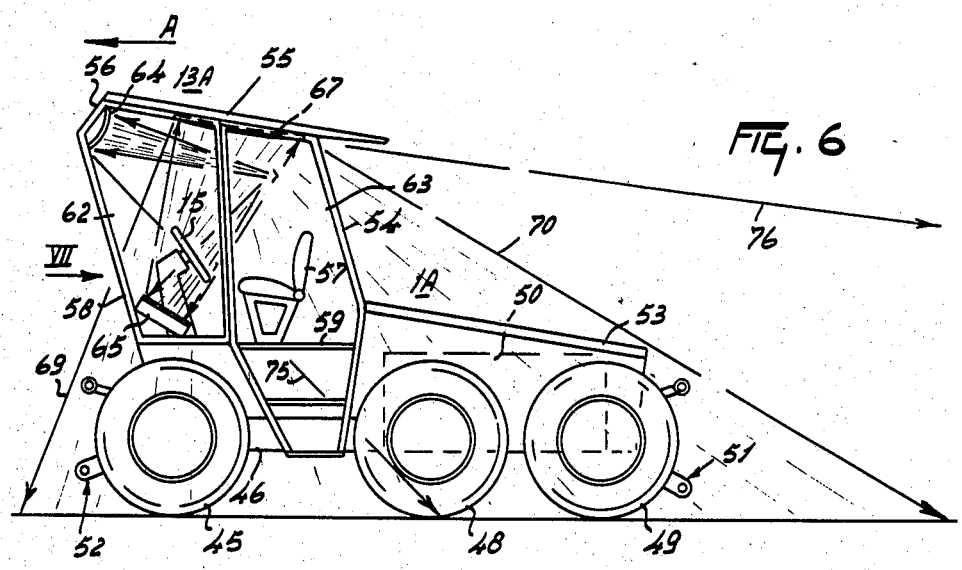
FIG. 6 is a side elevation of another tractor.
Figure 7:
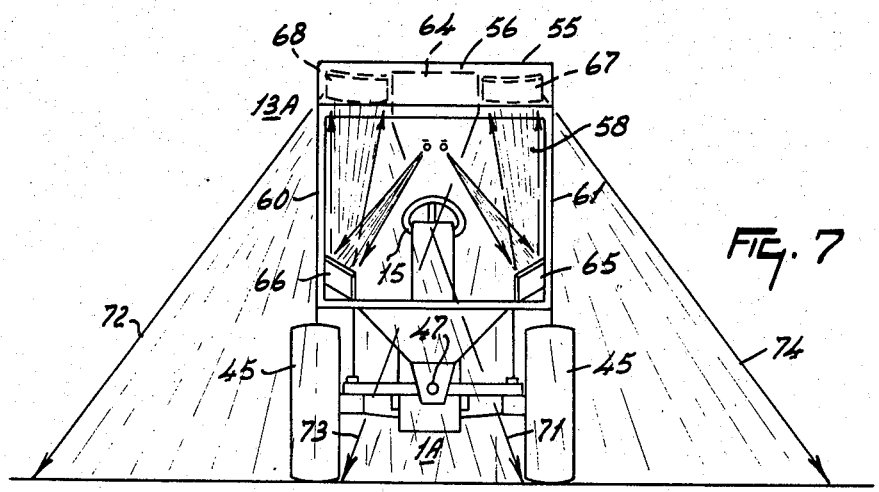
FIG. 7 is a view in the direction of the arrow VII in FIG. 6.

The embodiment shown in FIGS. 6 and 7 comprises a tractor 1A having a cab 13A located at the front of the tractor. The tractor 1A has on each side one or more front wheels 45, which are steerable and can pivot together relatively to the tractor frame 46 about a horizontal pivotal shaft 47, extending in the direction of travel A. The tractor 1A has furthermore on each side one or more middle wheels 48 and one or more rear wheels 49, which are also pivotable about a pivotal shaft, which is coaxial with the pivotal shaft 47. All wheels 45, 48 and 49 can be driven by an engine 50, by means of drive shafts provided with universal joints, which are located in the longitudinal plane of symmetry of the tractor and meet, near the pivotal shafts 47, the axles of the wheels 45 and 49. Alternatively, the drive can be achieved by hydraulic wheel motors arranged near the wheels 45 and 49. The engine is mounted, as shown in the side elevation of FIG. 6, by the wheels 48 and 49 behind the cab 13A. At both the rear and the front, the tractor frame 46 has three-point lifting devices 51 and 52. The rear of the tractor may also, or alternatively, have a towing hook. Near each of the lifting devices there is a power take-off shaft for driving the implements. The engine 50 is covered by an engine cover 53, which is inclined upwardly from the rear of the tractor towards the front and joins a lower edge of a rear wall 54 of the cab 13A. This wall 54 extends from the cover 53 upwardly and is inclined towards the front. The rear wall 54 has a rear window covering substantially the whole rear wall 54 and meets at the top a roof 55, which is inclined slightly upwardly towards the front and which joins at its front edge a downwardly and forwardly inclined wall portion 56 connected to the front wall 58 of the cab. The wall portion 56 is closed and its lower edge is at a higher level than the top of the driver sitting on a seat 57. The lower horizontal edge of the wall portion 56 meets the front wall 58 which is downwardly and rearwardly inclined and has a front windshield extending over substantially its whole surface. The windshield extends from the lower edge of the wall portion 56 to the level of the floor 59 of the cab. The cab 13A has side walls 60 and 61 which, in the regions above the floor 59 consists substantially entirely of glass windows. There is a front side window 62 separated by a slender, vertical pillar from a rear side window 63. The rear side window 63 of the side wall 60 is part of a door of the cab 13A. The roof 55 projects rearwardly at least to a position over the junction between the cover 53 and the rear wall 54. The cab is located in the region between the front wheels 45 and the middle wheels 48.

At the foremost and top corner of the cab, on the inner side of the wall portion 56, there is a mirror 64, the lower edge of which lies above the level of the driver's eyes. The mirror 64 is rectangular and its height is at least twenty centimeters. Its length extends horizontally and transversely of the direction of travel A and covers about 40 to 60% of the inner width of the cab. The mirror 64 is again convex, the axis of curvature being located ahead of the mirror itself. At the places where the front windshield meets the floor 59 and the side windows 62 there are mirrors 65 and 66, which are thus located beneath the level of the driver's eyes. The inclination of these mirrors 65 and 66 are such that a line normal at the center of each of the mirrors is inclined upwardly, inwardly and rearwardly of the cab.

As shown in the side elevation of FIG. 6, two mirrors 67 and 68 are arranged above the region between the steering wheel 15 and the seat 57. They are located, as shown in the view of FIG. 7, one on each side of the lateral ends of the mirror 64. The mirrors 67 and 68 are substantially parallel to the underside of the roof 67 and are right next to the ceiling. The length of each of the mirrors 67 and 68 in the direction A is more than one-quarter of the total length of the cab ceiling, and is preferably about one half that length; their surface is at least one-tenth of the total ceiling surface. The mirrors 67 and 68 are preferably slightly curved in two planes, the center of curvature being above the mirror concerned. The shape and the boundaries of the mirrors 67 and 68 are such that they and the mirrors 65 and 66 enable the driver to overlook a space bounded at the front of the tractor by a plane 69 inclined forwardly and downwardly away from the front edges of the mirrors 67 and 68 respectively and bounded at the rear by a plane 70 inclined rearwardly and downwardly away from the rear edges of the mirrors 67 and 68 respectively. The design of the mirrors 65 to 68 is such that the coupling points of the lifting devices 51 and 52 or a towing hook, if any, lie within the space visible to the driver in these mirrors, (FIG. 6). The image visible in the mirrors 65 and 66 from the driver's seat is overlapped by the mirrors 67 and 68 respectively or the circumference of the mirrors 67 and 68 coincide, seen from the driver's seat.

The elevational view of FIG. 7 shows that the region overlooked by the driver by virtue of the mirrors 65 to 68 is bounded by the planes 71, 72 and 73, 74 respectively. The boundary planes 72 and 74 meet the ground along lines which extend parallel to the direction A. These lines enclose a strip of land about six meters wide. The boundary planes 71 and 73 meet the ground along lines which are also parallel to the direction A and are located within the inside surfaces of the front wheels extending in the direction of travel A or which make the coupling points of the lifting devices visible to the driver.

What is seen by the driver in the mirror 64 is bounded by the planes 75 and 76. These planes meet the ground along lines which are transverse of the direction A. The plane 75 meets the ground approximately at the middle wheels 48, and the boundary plane 76 extends parallel to the underside of the roof and so is downwardly inclined to the rear. In this embodiment as before, the driver can overlook a region about six meters wide and extending from in front of the coupling points of the front lifting device 52 rearwardly over a great enough distance to allow the driver to see several implements coupled in sequence with the tractor.

Figure 8:
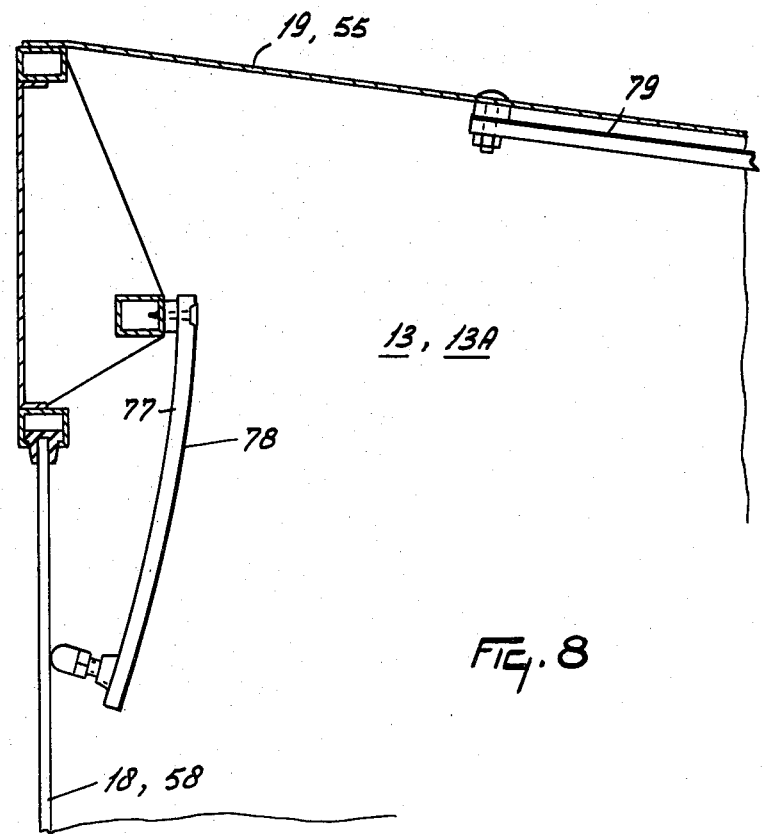
FIG. 8 is a vertical sectional view of a tractor cab.

The mirrors of all of the embodiments described are preferably made from materials which are resistant to breakage so that injuries are avoided. With reference to FIG. 8, the mirrors may comprise curved plexiglass plate 77 coated on one side with an aluminum compound 78. This mirror is shown in FIG. 8 by way of example for the mirrors 25, 32, 64. The mirrors may alternatively comprise a stainless steel plate coated on one side with a reflective foil. Other constructions of mirrors for use with the described embodiments may comprise a plexiglass plate 77 coated on one surface with a silver layer 79 (FIG. 8) or a toughened glass plate silver-plated on one surface.

The quality of the images visible to the driver in the mirrors is improved because the rear wall 54 and the roof 55 are at an obtuse angle to one another. The projecting part of the roof above the rear wall 54 helps to avoid troublesome reflections.

The disposition of the rear windshield in the rear wall 20 (FIG. 2), which approximately corresponds to that of the mirror 25, also helps to reduce unwanted reflections.

It is desirable for all transparent panels of the cabin through which the driver sees by virtue of the mirrors to be provided with wipers.

All mirror arrangements described for tractors like those of FIGS. 1 to 5 can also be used in tractors like that of FIGS. 6 and 7.

The mirror arrangements described can also be applied to earth displacing machines, street cleaning vehicles and also to transport vehicles towing for example, one or more trailers in confined spaces, such as in stores and factories.

Although various features of the tractors and their mirror arrangements, described and illustrated in the drawings, will be set forth in the following claims as inventive features, it is to be understood that the invention is not necessarily limited to these features and may encompass other features that have been described both individually and in various combinations.

Having described my invention, what I claim as new and desire to secure by Letters Patent of the United States is:

1. A vehicle such as an agricultural tractor which comprises: coupling means at the vehicle's rear for attachment of implements; a cab, an operator's seat and controls in said cab, said comprising front, side and rear walls and a roof, said side and rear walls including transparent windows and said front wall including a windshield; a first mirror in said cab disposed in front of said operator's seat; and a second mirror in said cab disposed substantially parallel to said roof and located at least in part above the space between said operator's seat and said windshield; said first and second mirrors disposed relative to each other and an operator of the vehicle in said operator's seat whereby at least part of an implement attached to said coupling means and surface of the ground at one lateral side of the tractor are visible to an operator viewing said first mirror from said operator's seat through images reflected from said second mirror to said first mirror.

2. A vehicle in accordance with claim 1 wherein said first mirror and said second mirror are both located adjacent a side wall of said cab, said first mirror being disposed on one side of said controls and said second mirror being disposed adjacent said roof.

3. A vehicle in accordance with claim 2, wherein a further first mirror and a further second mirror are disposed in said cab opposite said first mentioned first and second mirrors relative to a vertical plane through the longitudinal axis of the vehicle.

4. A vehicle in accordance with claim 3 wherein a third mirror is disposed adjacent said roof and said front wall, said third mirror disposed whereby an operator in said operator's seat has a view to the rear of said vehicle by means of said third mirror.

5. A tractor as claimed in claim 1, in which a third said mirror is mounted on part of said front wall of said cab.

6. A vehicle as claimed in claim 1 in which a line normal to the center of said first mirror is inclined upwardly and inclined to a longitudinal central plane of the vehicle.

7. A vehicle as claimed in claim 1 in which said first mirror extends upwardly and said second mirror is generally horizontal.

8. A vehicle as claimed in claim 1 in which said second mirror is arranged near to said roof of said cab.

9. A vehicle as claimed in claim 1 in which said first mirror is disposed below eye-level of an operator in said operator's seat.

10. A vehicle as claimed in claim 9, in which a line normal to the center of said first mirror is inclined upwardly to the rear and is inclined inwardly to the rear towards the longitudinal central plane of the vehicle.

11. A vehicle as claimed in claim 1 in which second mirror is curved and an axis of curvature thereof is above said one mirror.

12. A vehicle as claimed in claim 11, in which said second mirror is curved in two planes.

13. A vehicle as claimed in claim 1 in which said second mirror is disposed at a level above said operator's seat and at generally the same position along the length of the vehicle as said seat.

14. A vehicle as claimed in claim 1, in which said mirrors comprises reflective foil applied to a plate.

15. A vehicle as claimed in claim 1 including at least one further mirror in said cab in which the regions visible in said mirrors to an operator in said seat includes areas of ground on each side of the vehicle.

16. A vehicle as claimed in claim 15, in which the regions visible in said mirrors to an operator in said seat includes an area of ground located in front of the vehicle.

17. A vehicle as claimed in claim 16, in which the regions visible in said mirrors to a driver in said operator's seat includes an area of ground located behind the vehicle.

18. A vehicle as claimed in claim 13, in which further said coupling means is mounted on the front of the vehicle.

19. A vehicle as claimed in claim 1, in which said operator's seat is near the rear of the vehicle.

20. A vehicle as claimed in claim 1, in which said operator's seat is located near said coupling means.

21. A vehicle as claimed in claim 1, in which at least one further mirror is provided, said further mirror extending over not less than one-quarter of the width of said roof in said cab.

22. A vehicle as claimed in claim 1, in which said mirrors are disposed so as to leave unobstructed forward vision of an operator in said seat.

23. A vehicle as claimed in claim 21 in which not less than one tenth of said roof's interior surface area and of the width of said front wall of said cab is provided with said second and further mirrors.

24. A mirror arrangement in accordance with claim 1, wherein said first mirror is mounted on the deck of said cab.

25. An agricultural tractor which comprises rearwardly extending coupling means for the attachment of agricultural implements; a cab, an operator's seat and controls in said cab, said cab comprising front, side and rear walls and a roof, said side and rear walls having transparent windows and said front wall having a windshield; a first mirror disposed in front of said operator's seat; and a second mirror disposed substantially parallel to said roof and being fastened to said cab at a location higher than the head of an operator of normal height who is sitting in said seat, said second mirror being curved in two planes with the centers of said curvatures being above said second mirror; said first and second mirrors cooperating with each other and located relative to an operator of said tractor in said operator's seat whereby at least part of an implement attached to said coupling means and the ground on one lateral side of the tractor are visible to such operator by viewing in said first mirror images which include said implement part and said ground which are reflected from said second mirror to said first mirror.

26. A tractor in accordance with claim 25 wherein said first mirror is secured in said cab at the side of said controls.

27. An agricultural tractor which comprises: a means at its rear for coupling implements; a cab, an operator's seat and controls including a steering wheel in front of said operator's seat in said cab, said cab comprising front, side and rear walls and a roof, said side and rear walls including transparent windows and said front wall having a windshield; a first mirror disposed in front of said operator's seat; and a second mirror disposed substantially parallel to said roof and above a horizontal plane passing through the eyes of any operator whose height is within the normal ranges for an adult and who is sitting upright in said operator's seat whereby the operator's view through a complete arc of 360° is not impeded by said second mirror in any horizontal direction; said first and second mirrors having a mutual relationship whereby an operator of the tractor occupying said operator's seat has a view of at least part of an implement attached to said coupling means and also of the surface of the ground on at least one lateral side of the tractor through said first mirror by means of the reflection thereof to said first mirror from said second mirror.

28. A tractor in accordance with claim 27 wherein said second mirror is attached to the interior of said roof above the head of an operator occupying said seat.

29. An agricultural vehicle which comprises means for coupling implements at its rear; a cab, an operator's seat and steering controls in said cab, said cab comprising a front, side and rear walls and a roof, said side and rear walls including transparent windows and said front wall being provided with a windshield, a pair of first mirrors disposed in front of said operator's seat on each side of said controls, and a pair of second mirrors disposed substantially parallel to said roof, one of said second mirrors being located adjacent the left said side wall and the other said second mirror being located adjacent the right said side wall near the tops of said side walls; said first mirrors and said second mirrors disposed relative to each other and an operator of the tractor occupying said operator's seat whereby at least part of an implement attached to said coupling means and the surface of the ground at both lateral sides of the tractor are visible to an operator viewing said first mirrors from said operator's seat through images of said implement part and said surfaces reflected from said second mirrors respectively to said first mirrors.

30. An agricultural tractor in accordance with claim 29 wherein a third mirror is disposed adjacent said windshield and between said second mirrors as seen from a front elevational view of the tractor.

31. A tractor in accordance with claim 30 wherein said second mirrors and said third mirror are convex relative to an operator occupying said seat.

* * * * *